(12) United States Patent  
Friedman et al.

(10) Patent No.: US 8,156,304 B2  
(45) Date of Patent: Apr. 10, 2012

(54) DYNAMIC DATA STORAGE REPARTITIONING

(75) Inventors: David Friedman, San Francisco, CA (US); Prasad V. Bagal, San Jose, CA (US); William Havinden Bridge, Jr., Alameda, CA (US); Richard L. Long, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 218 days.

(21) Appl. No.: 12/631,737

(22) Filed: Dec. 4, 2009

(65) Prior Publication Data

US 2011/0138148 A1 Jun. 9, 2011

(51) Int. Cl.
*G06F 12/00* (2006.01)

(52) U.S. Cl. ......... 711/173; 711/153; 711/156; 707/770

(58) Field of Classification Search .................. 711/173, 711/153, 156; 707/770
See application file for complete search history.

(56) References Cited

U.S. PATENT DOCUMENTS

| | | | | |
|---|---|---|---|---|
| 5,652,863 | A * | 7/1997 | Asensio et al. | 711/173 |
| 6,125,370 | A * | 9/2000 | Courter et al. | 1/1 |
| 6,269,375 | B1 * | 7/2001 | Ruddy et al. | 1/1 |
| 6,272,503 | B1 * | 8/2001 | Bridge et al. | 1/1 |
| 6,275,898 | B1 * | 8/2001 | DeKoning | 711/114 |
| 6,360,300 | B1 * | 3/2002 | Corcoran et al. | 711/139 |
| 6,549,901 | B1 * | 4/2003 | Loaiza et al. | 1/1 |
| 7,409,523 | B2 * | 8/2008 | Pudipeddi et al. | 711/173 |
| 7,444,318 | B2 * | 10/2008 | Sahni et al. | 1/1 |
| 7,644,087 | B2 * | 1/2010 | Barkai et al. | 707/770 |
| 7,921,262 | B1 * | 4/2011 | Dash et al. | 711/154 |
| 7,966,607 | B1 * | 6/2011 | Lam et al. | 717/148 |
| 2004/0258061 | A1 * | 12/2004 | Sahni et al. | 370/389 |
| 2006/0190243 | A1 * | 8/2006 | Barkai et al. | 704/8 |
| 2007/0143563 | A1 * | 6/2007 | Pudipeddi et al. | 711/173 |
| 2009/0077097 | A1 * | 3/2009 | Lacapra et al. | 707/10 |
| 2009/0106255 | A1 * | 4/2009 | Lacapra et al. | 707/10 |
| 2010/0106934 | A1 * | 4/2010 | Calder et al. | 711/173 |
| 2010/0235606 | A1 * | 9/2010 | Oreland et al. | 711/173 |

* cited by examiner

*Primary Examiner* — Stephen Elmore  
(74) *Attorney, Agent, or Firm* — Fliesler Meyer LLP

(57) ABSTRACT

Embodiments of the present invention enable dynamic repartitioning of data storage in response to one or more triggers. In embodiments, a trigger may be a user-initiated action, a system-generated action, and/or an inference based on storage usage parameters. Applications of the present invention are its use in embodiments of a storage management system comprising a file system manager and a volume manager, where the placement of data into a partition (data storage region) may be specified by matching one or more disk region placement data attributes assigned to data with corresponding disk region attributes. In embodiments, dynamic repartitioning comprises adjustment of the location of the boundary between adjacent disk partitions and, if necessary, rebalancing of the data stored within the partitions by identifying mismatched data and relocating it to the partition with which it is associated.

20 Claims, 10 Drawing Sheets

600

- Receive a request to repartition a disk having a first partition and a second partition that share an adjustable boundary, where data is allocated to a partition based on identifying an association between at least one attribute of the data and at least one attribute of the partition ⟋ 605

- Adjust the boundary between the partitions in response to an update to a set of triggers ⟋ 610

- Rebalance the data allocated to the disk, if appropriate ⟋ 615

FIGURE 6

DYNAMIC DATA STORAGE REPARTITIONING

BACKGROUND

1. Technical Field

The present invention pertains generally to data storage management, and relates more particularly to dynamic data storage repartitioning.

2. Background of the Invention

Data storage space within a mass storage device is not homogeneous, and the region of a device within which data is stored may determine the performance characteristics of accessing that data. FIG. 1 depicts data storage regions on a disk, an exemplary mass storage device. The outer regions of a disk (that are furthest from the spindle 125) provide higher performance data access than the inner regions (that are closer to the spindle 125) because the disk circumference is greater towards the disk's outer edge. Tracks within a disk outer region enable higher data transfer rates (e.g., faster reads) because of their greater speed and bandwidth.

The storage space on a disk may be divided into multiple regions (partitions). FIG. 1 illustrates an exemplary two partition disk storage space layout, in which the disk storage space has been divided into an outer partition 110 and an inner partition 120 that share a static partition boundary 135. Data 115 have been stored in both partitions, and the portion of the disk that does not contain allocated data (free space 130) is distributed between both partitions. Different types of data and/or file systems may be stored within the different partitions of a disk based on matching different performance requirements of the data to the different performance characteristics of the partitions.

The choice of the disk partition sizes should be carefully considered when choosing a disk space layout, because the relative sizes of the partitions are fixed while the amount and type of stored data may change over time. If a partition becomes filled (i.e., there is no more available free space 130 within the partition), increasing the size of the partition requires statically repartitioning the disk space by relocating the partition boundary 135 after either adding additional system storage space (e.g., adding a new disk drive) or changing the relative sizes of the disk partitions on the existing disk. Static repartitioning of disk space has high resource and system performance costs, since the stored data typically are transferred to temporary storage and then reallocated to the newly created partitions. Reallocation may not be possible for certain kinds of stored data, and this type of operation impacts system performance. Since reallocation typically is performed offline, it also impacts system availability.

SUMMARY OF THE INVENTION

Embodiments of the present invention enable dynamic repartitioning of data storage in response to one or more triggers. In embodiments, a trigger may be a user-initiated action, a system-generated action, and/or an inference based on storage usage parameters. Applications of the present invention are its use in embodiments of a storage management system comprising a file system manager and a volume manager, where the placement of data into a partition (data storage region) may be specified by matching one or more disk region placement data attributes assigned to data with corresponding disk region attributes. In embodiments, dynamic repartitioning comprises adjustment of the location of the boundary between adjacent disk partitions and, if necessary, rebalancing of the data stored within the partitions by identifying mismatched data and relocating it to the partition with which it is associated.

In embodiments, a computer program product stores one or more sequences of instructions that, when executed by one or more processors, causes the one or more processors to execute a computer-implemented method for dynamically repartitioning data storage comprising partitions. In embodiments, the executed steps may comprise adjusting the location of at least one adjustable boundary between partitions of the data storage in response to a request to repartition the data storage; and rebalancing the data allocated to the data storage by relocating identified mismatched data in a first storage partition to a second storage partition. In embodiments, the request to repartition the data storage is in response to at least one trigger in a set of triggers being satisfied, and data is allocated to a data storage partition based on identifying an association between at least one attribute of the data and at least one attribute of the partition, and the mismatched data located in the first storage partition has an attribute associated with the second data storage partition.

In embodiments, the data storage is virtual storage. In embodiments, the set of triggers may comprise at least one of: a change in the ratio of the first partition size to the second partition size; a change in data storage; a data rebalancing request received from a user; a partition having reached a threshold limit of available storage space; and a set of storage usage parameters.

In embodiments, the value of a data attribute may be assigned by at least one of: assigning the value to an attribute of a data file; assigning the value to an attribute of a class or type, and assigning the data file to the class or the type; assigning the value to an attribute of a customizable template, and associating the data file with the template; and determining the value by inference based on data file usage parameters, and assigning the value to an attribute of the data file. In embodiments, the data attribute value is configurable. In embodiments, the data attribute is a performance attribute that is assigned a higher performance value or a lower performance value. In embodiments, performance critical data that is assigned the higher performance value is associated with a higher performance partition.

In embodiments, data allocated to the first partition and data allocated to the second partition are compacted by being placed adjacent to the adjustable boundary between the first partition and the second partition. In embodiments, rebalancing data allocated to the data storage comprises alternately examining the first partition and the second partition to identify the mismatched data. In embodiments, rebalancing data allocated to the data storage further comprises compacting the data in at least one partition.

In embodiments, a computer processing system for dynamically repartitioning data storage comprising a plurality of partitions may comprise a boundary configurator that adjusts the location of a boundary between a first partition and a second partition within the plurality of partitions in response to receiving a request to repartition the data storage; and a data reallocator that rebalances data allocated to the data storage in response to identifying mismatched data located in the first partition and having an attribute associated with the second partition by relocating the mismatched data to the second partition. In embodiments, the request to repartition the data storage is in response to at least one trigger in a set of triggers being satisfied. In embodiments, the value of a data attribute is user-defined or usage-defined.

In embodiments, a method for reallocating data allocated to data storage comprising a plurality of partitions in response to adjusting the location of a boundary between a first partition and a second partition within the plurality of partitions may comprise identifying mismatched data located in the first partition having an attribute associated with the second partition; and relocating the mismatched data to the second partition.

In embodiments, the first partition and second partition are processed alternately by examining segments within each partition to identify mismatched data. In embodiments, selecting a segment for examination is based on proximity of the segment location to the location of the boundary between the partitions. In embodiments, the method for reallocating data may further comprise compacting data within at least one partition of the data storage.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 6 depicts a method for dynamic storage repartitioning according to various embodiments of the invention.

DETAILED DESCRIPTION OF THE PREFERRED EMBODIMENTS

Figure 1:
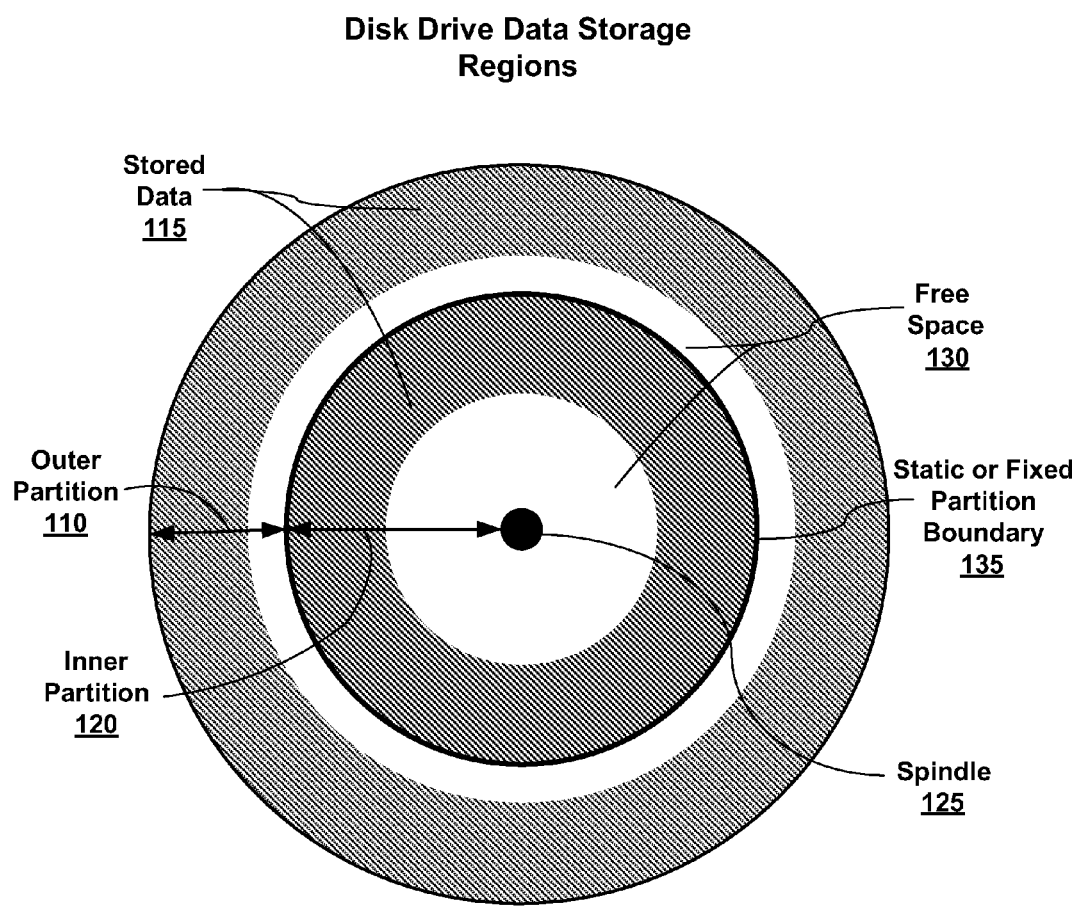
FIG. 1 illustrates data storage regions on an exemplary disk having two static partitions.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

A. Overview

One specific application of the invention is its use in embodiments of an automatic storage management system comprising a file system manager and a volume manager, such as Oracle Database 11g Oracle Automatic Storage Management (Oracle ASM) by Oracle International Corporation of Redwood Shores, Calif. These embodiments will be described for illustrative purposes and not for limitation. Those skilled in the art shall recognize the general applicability of the present invention.

Figure 2:
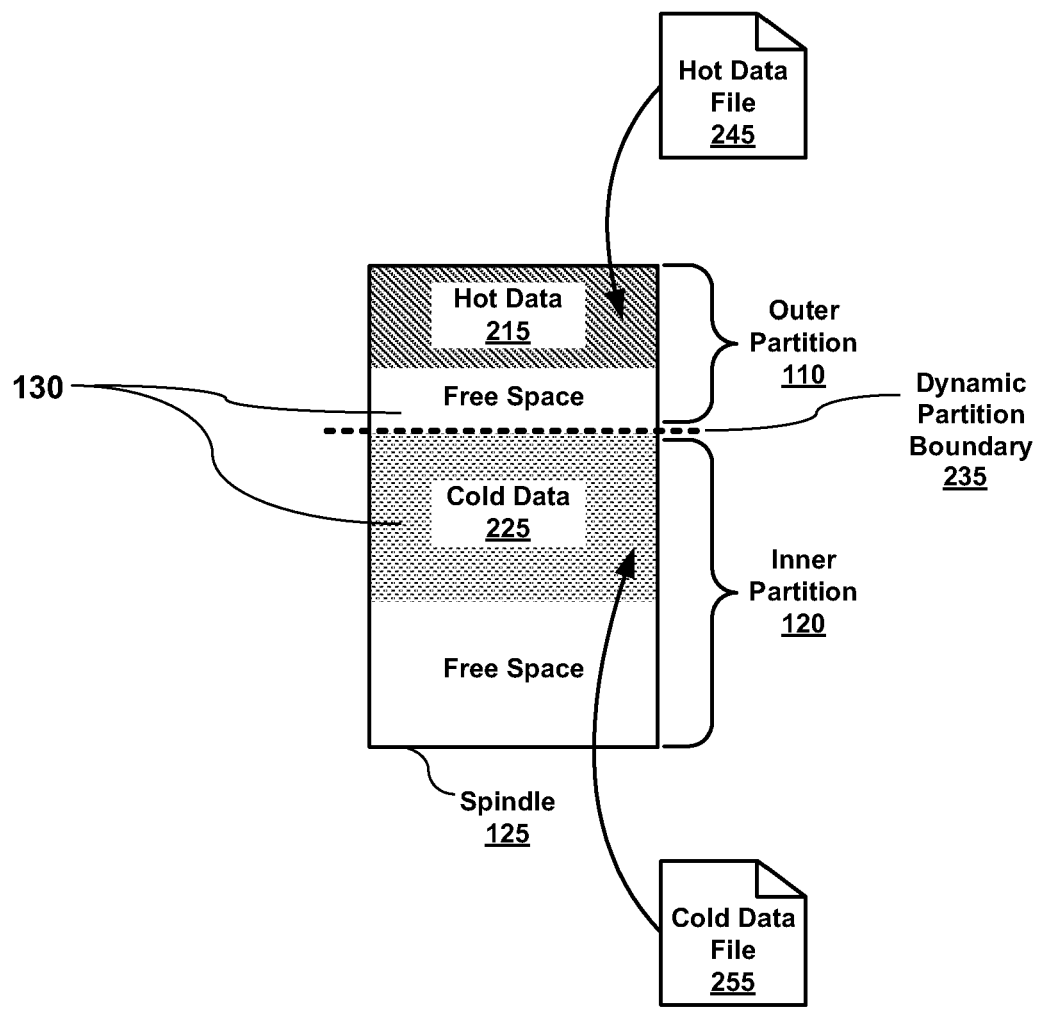
FIG. 2 illustrates an exemplary partitioned disk according to various embodiments of the invention.

FIG. 2 illustrates an exemplary partitioned disk according to various embodiments of the invention. In various embodiments, the exemplary disk may be a physical storage device, while, in alternative embodiments, the exemplary disk may be a virtual disk representing a storage array or other type of distributed storage media. In embodiments, the performance of portions of the virtual storage may be used to form higher performance and lower performance partitions. Those skilled in the art will recognize that a variety of storage management schemes exist, and that the choice of storage management scheme is not critical to the invention.

The exemplary disk depicted in FIG. 2 has been partitioned into an inner partition 120 and an outer partition 110 with free space 130 distributed between the partitions in like manner as the exemplary disk illustrated in FIG. 1 is partitioned. In embodiments, the placement of data into a partition (data storage region) may be specified according to the correspondence between a performance requirement of the data and a performance characteristic of the partition. For example, a frequently accessed data file (a "hot" data file 245) may be stored within a partition closer to the outer edge of the disk (a "hot" data region 210), while a less frequently accessed data file (a "cold" data file 255) may be stored within a partition closer to the spindle 125 (a "cold" data region 220). In embodiments, data files having temporal locality (i.e., referenced at approximately the same time) may be stored close together physically on a disk to reduce latency during I/O. In another example, a primary file 245, which is accessed frequently, may be placed in a hot data region 210, while its mirror copy 255 (less frequently accessed) may be placed in a cold data region 220. The portions of the partitions that do not contain stored data have free space 130 on which data can be stored.

1. Disk Region Placement Data Attributes

In embodiments, a user may specify the placement of data on a disk by assigning one or more disk region placement attributes to the data. For example, in embodiments, disk region placement data attributes may represent performance requirements of the data such as "hot" (frequently accessed data), and "cold" (infrequently accessed data). In various embodiments, one or more disk region placement attributes may be assigned to a data file via one or more interfaces provided by a file manager. In embodiments, a data file may be a complete file or a portion of a file, such as a logical extent managed by a virtual storage manager. In various embodiments, the value of a data storage attribute may differ among portions of a file. Exemplary file manager interfaces may include a graphical user interface (GUI), operating system shell command interface, and an application programming interface (API) that may receive programming language (such as SQL) statements, although those skilled in the art will recognize that the choice of interface implementation is not critical to the invention. In various embodiments, disk region placement attributes may be assigned to a data file by a user and/or may be assigned automatically based on inferences of a file's performance characteristics from a set of storage usage parameters (such as, by way of example and not limitation, I/O patterns, frequency of access, type of file, etc.).

In various embodiments, one or more disk region placement attributes may be assigned to a data file at the time that the file is created. In embodiments, a disk region placement attribute may be assigned to a data file explicitly and/or implicitly. In various embodiments, a disk region placement attribute may be assigned implicitly to a data file by associating the data file with a template or classification that includes the attribute as a property. For example, in embodiments, a storage management properties template may be created, and an instance of the template may be defined for each of a set of file categories. In embodiments, storage management template properties may include redundancy (e.g., no mirror, 2-way, or 3-way), striping (e.g., coarse or fine), region for placement of primary (e.g., hot or cold), and region for placement of mirror (e.g., hot or cold). Thus, a storage management template instance for a "tempfile" file category may specify that the region for placement of the primary and mirror copies of a file is a cold region, and the association of a newly created file with the "tempfile" template instance implicitly will assign a cold disk region placement attribute to the primary and to the mirror copies of the newly created file.

In embodiments, the disk region placement attributes assigned to a data file may be modified after the file has been created. Being able to modify the disk region placement attribute of data enables customization of the placement of stored data based on the access performance requirements of the data, and also enables modification of the placement of stored data in response to changing requirements of the data. For example, a data file containing hotel reservation information may be assigned a hot disk region placement attribute at its creation because of its initial frequent access, and its disk region placement attribute later may be changed to cold after the reservation was used and its access becomes infrequent.

In embodiments, modification of a disk region placement attribute may be explicit (such as modifying a file attribute via a file manager interface), or it may be implicit (such as modifying a property of a template or classification to which a file belongs). In various embodiments, a modification of a data file's disk region placement attribute may be applied to extensions of the file created after the modification, and further be applied to the original data file and to its previously created extensions when the stored data on the disk are rebalanced by being relocated to a disk partition having characteristics that match current values of the disk region placement attributes associated with the stored data.

2. Dynamic Disk Repartitioning

Figure 3:
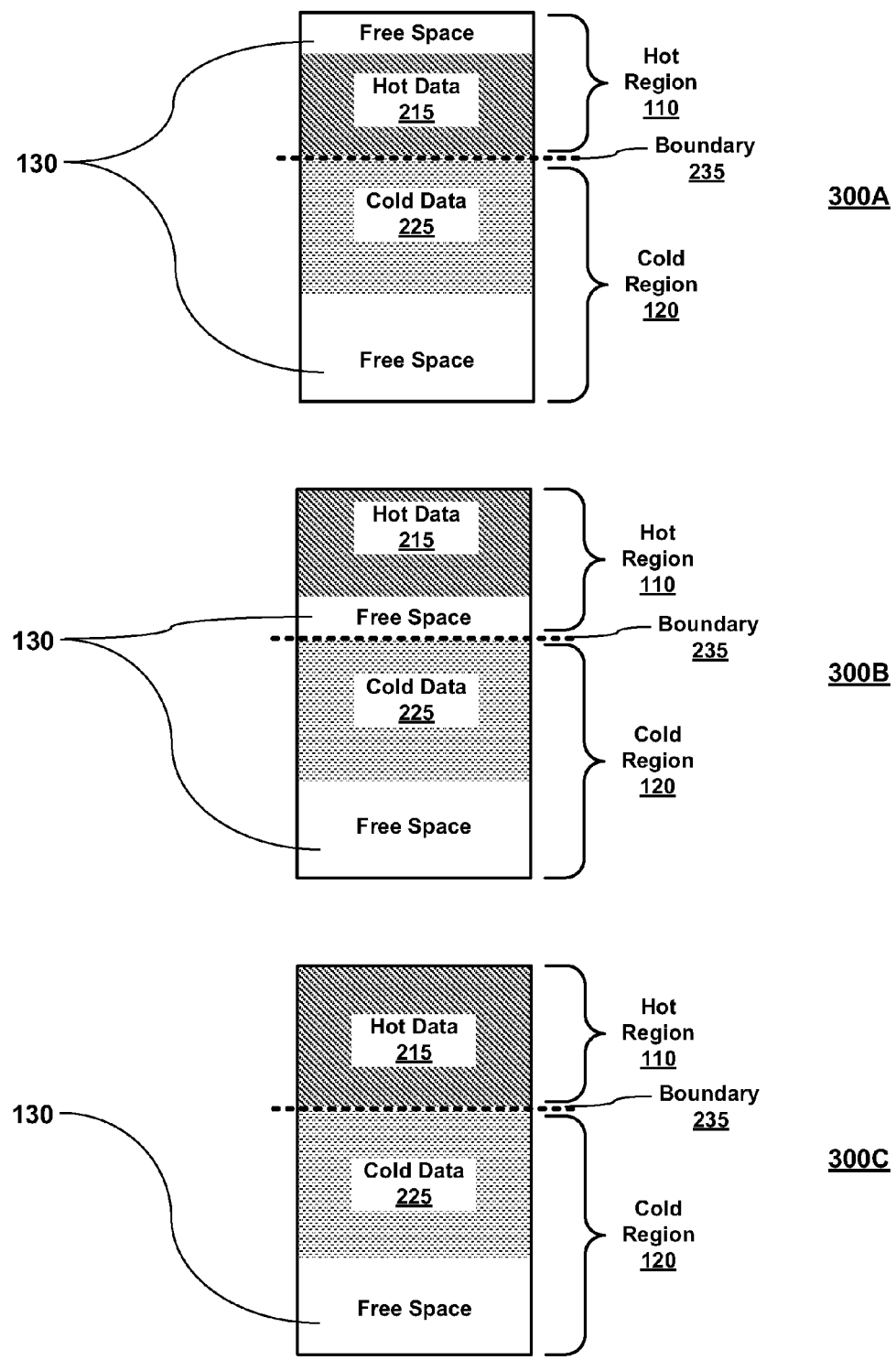
FIG. 3 illustrates three exemplary two-partition disk data layouts for improving storage usage and data access performance according to various embodiments of the invention.

FIG. 3 illustrates three exemplary disk data layouts for improving storage usage and data access performance according to various embodiments of the invention. All three examples illustrate a disk that has been divided into two partitions (a hot (performance critical) partition 110 and a cold (less performance critical) partition 120) based on the location of a partition relative to the disk spindle 125.

In various embodiments, the relative sizes of the hot region 110 and the cold region 120 may be proportional to storage usage parameters. In an exemplary two partition scenario, partitioning may be based on the ratio of allocated hot data 215 to allocated cold data 225, and the storage usage and data access performance may be improved by dynamic rebalancing of the relative sizes of the partitions in response to changes in the ratio of hot to cold data. For example, in embodiments, the percentage of the disk occupied by each partition may correspond to the percentage of its corresponding set of allocated data, and if at least one of the percentages of allocated data changes by more than a threshold value, the disk partition sizes are rebalanced to correspond to the new allocated data percentage values.

In the disk data layout illustrated in example 300A, the stored data in both partitions (215 and 220) are placed close together on the disk. Keeping the allocated region of the disk compact minimizes seek time for data access. In example 300A, the disk free space 130 is allocated into both partitions to ensure that there is available storage space in the hot region 110 for additional performance critical data and available storage space in the cold region 120 for additional less performance critical data. In embodiments, performance critical data may be identified by its associated disk region placement attribute.

Example 300B illustrates a disk data layout similar to the layout in example 300A, except that the stored performance critical data 215 are placed physically at the outer region of the disk, while the free space 130 of the hot region 110 is placed near its boundary 235 with the cold region 120. In this case, average seek time may be greater than the average seek time of example 300A because the allocated region of the disk is not as compact (note placement of the hot region free space between the stored data regions 210 and 220), but full usage of the best performing portion of the disk for stored performance critical data is insured. In various embodiments, this configuration 300B may be used to improve overall system performance. A read can be satisfied by accessing a primary file, but both the primary file and mirror copies must be accessed in order to satisfy a write operation. Since most applications perform more reads than writes, this configuration 300B in which primary data files are stored in the hot region 110 and mirror copies are stored in the cold region 120 would be beneficial for overall system performance.

Example 300C illustrates a disk data layout optimized for high performance, with all of the disk free space 130 in the cold region 120. As in example 300A, the allocated region of the disk is compact so that average seek time is minimized, and, as in example 300B, the performance critical data are placed in the best performing portion of the disk. In this type of layout, there is no unused space in the high performance disk region 110, and any new data to be stored will be placed in the cold region 120 regardless of its performance characteristics. In such a layout, space may be added to the hot disk region 110 by dynamic partitioning of the disk to accommodate additional performance critical data being moved into the high performance disk region.

In embodiments, dynamic partitioning may be used to maintain a disk data layout in response to various types of system and data changes. For example, storage reallocation may occur (e.g., addition or removal of disks), and the sizes of the partitions may need to be increased or decreased in order to maintain their relative size ratio. In another example, available free space within a partition may be exhausted, and the size of the partition may be increased in order to accommodate additional data, as was previously described for the layout in example 300C.

Since, as previously discussed, static repartitioning of disk space has high resource and system performance costs, it typically is performed infrequently and in response to significant changes in the storage system, such as after a major system modification has been made and/or a set of cumulative changes to storage system parameters has occurred. Being able to dynamically reparation a disk would provide a flexible storage management system that enables incremental adjustment of one or more disk partition boundaries in direct response to changing system and data requirements.

In embodiments, dynamic repartitioning comprises adjusting the location of a partition boundary 235 in response to changes in characteristics of the storage system and/or the stored data to maintain a disk partitioning scheme. In embodiments, adjustment of a partition boundary 235 may be performed while the storage management system is online. In various embodiments, stored data may be re-balanced after a partition boundary adjustment based on one or more disk region placement attributes associated with the stored data.

In various embodiments of the invention, dynamic repartitioning of a disk may occur in response to an update to one or more triggers. In various embodiments, a trigger may be one or more of the following: a user-initiated action such as generating a data rebalancing command, or creating or deleting a file; a system-generated action such as indicating that free space in a partition has fallen below a threshold value, or completion of system storage reallocation (e.g., adding or removing disks)); and an inference based on storage usage parameters comprising attributes of the data stored on the disk. Those skilled in the art will recognize that a variety of triggers exists, and that the choice of triggers for dynamic repartitioning of data storage is not critical to the invention.

In embodiments, a storage system may implement one or more policies that leverage data disk region placement attributes in order to reduce the performance cost of dynamic repartitioning. In an exemplary policy, a newly created data file which has been assigned a hot disk region placement attribute (a hot file) initially may be placed in a cold disk partition for minimal interference with system performance, and the stored data may be re-balanced later so that the hot file may be moved into a hot disk partition. Rebalancing of allocated data may update a trigger for dynamic repartitioning of the disk (e.g., there is no free space in the hot partition to accommodate storage of the additional hot file), and dynamic repartitioning may be scheduled as a background process to execute at a future time. In various embodiments, the system performance cost of implementing dynamic disk repartitioning as a single event may be reduced by scheduling and executing partition boundary adjustment and data re-balancing as separate events.

In embodiments, the flexibility of dynamic partitioning enables the implementation of high performance disk partitioning schemes, such as example 300C, which may not be feasible for statically partitioned storage systems with changing data requirements because of the high cost of having to create new static partitions. In an exemplary dynamic partitioning scenario, the dynamic boundary 235 between the hot region 110 and the cold region 120 in example 300C can be shifted to increase the relative size of the hot region 110 in response to an update to a trigger when additional performance-critical data (specified by a hot disk region placement attribute) is stored on the disk.

3. Disk Layouts Having More than Two Partitions

Figure 4:
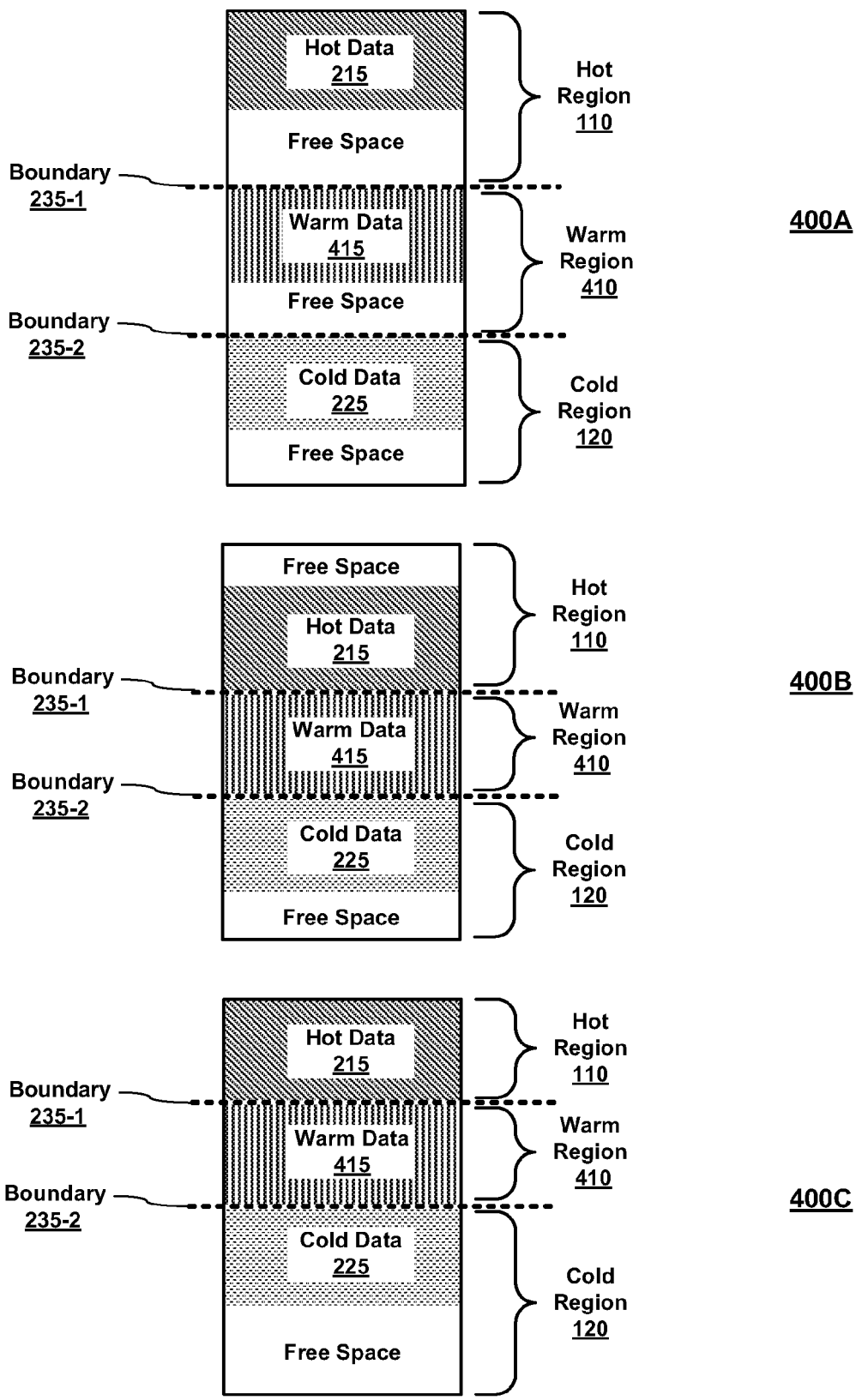
FIG. 4 illustrates three exemplary three-partition disk data layouts for improving storage usage and data access performance according to various embodiments of the invention.

Aspects of the present invention may be extended to disk layouts having more than two partitions. FIG. 4 depicts, for illustration and not for limitation, three exemplary three-partition disk data layouts for improving disk usage and data access performance according to various embodiments of the invention. In each of the examples, the disk layout contains two dynamic partition boundaries 235-1 and 235-2, and a third "warm" region 410 for performance critical, but not highly performance critical, stored data. Those skilled in the art will recognize that a variety of disk layouts exist, and that the choice of the number of partitions for a disk layout is not critical to the invention. In various embodiments, dynamic partitioning may comprise moving one or more of the partition boundaries.

In embodiments, the disk layout in example 400A may occur in a scenario in which there are roughly equal amounts of the three types of stored data (hot 215, warm 415, and cold 225), and the free space is distributed equally within each partition (110, 410, and 120) similarly to the distribution of free space in example 300B. The lack of free space in the warm region 410 in examples 400B and 400C allows compaction of the allocated data regions within a disk to maximize performance, as previously discussed. In example 400C, the disk free space only is in the cold region 120, so that the allocated data regions are placed in the best performing regions of the disk, similarly to the high performance partitioning scheme previously described for example 300C.

B. System Implementations

Figure 5:
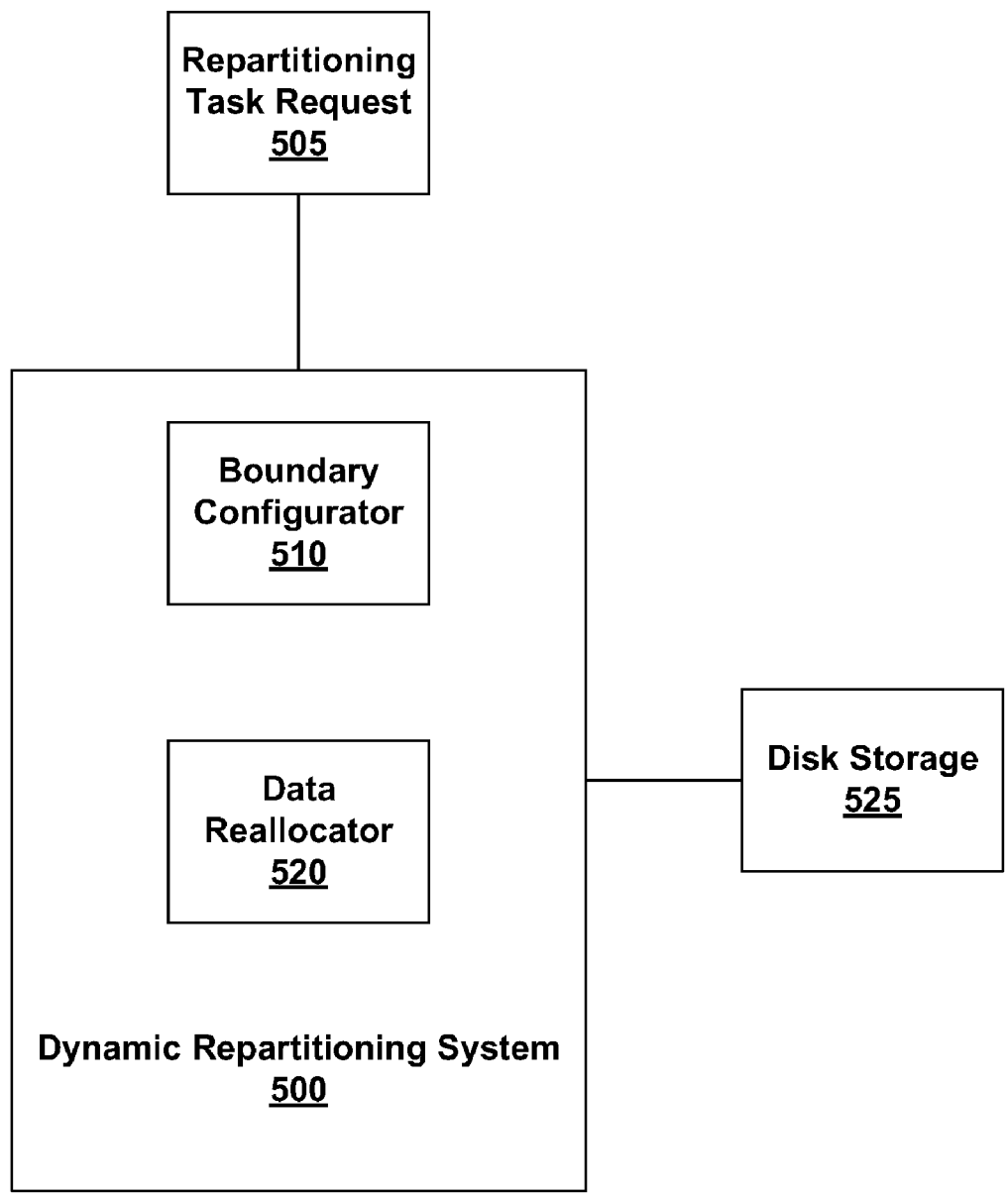
FIG. 5 depicts a block diagram of a storage dynamic repartitioning system according to various embodiments of the invention.

FIG. 5 depicts a block diagram of a dynamic repartitioning system 500 for repartitioning data storage 525 according to various embodiments of the invention. Dynamic repartitioning system 500 comprises a boundary configurator 510 and a data reallocator 520.

Embodiments of dynamic repartitioning system 500 may be implemented within a storage management system that is deployed on a single host computer connected to data storage, and/or deployed within a clustered computing environment or a grid computing infrastructure comprising a plurality of networked computers and data storage. Alternate embodiments of dynamic repartitioning system 500 may be implemented as part of a storage foundation framework providing virtual storage management to one or more storage devices. Those skilled in the art will recognize that specific implementation and deployment platform choices for an embodiment of dynamic repartitioning system 500 are not critical to the invention.

In embodiments, boundary configurator 510 adjusts the location of one or more disk partition boundaries in response to receiving a repartitioning task request 505. In embodiments, adjustment of a partition boundary 235 may be performed while the storage management system is online. In various embodiments, the repartitioning task request 505 comprises at least one parameter that identifies the adjusted location of a partition boundary 235 and/or enables computation of the adjusted boundary location.

In various embodiments, a repartitioning task request 505 may be generated in response to an update to one or more triggers. As previously described, a trigger may be a user-initiated action, a system-generated action, and/or an inference based on storage usage parameters comprising attributes of the data stored on the disk.

In embodiments, data reallocator 520 rebalances stored data after adjustment of at least one data partition boundary. In various embodiments, rebalancing stored data comprises identifying data that is associated with one partition but is placed within another partition, and then re-allocating the misplaced data into the partition with which it is associated. In embodiments, the association of data with a partition is identified based on matching one or more disk region placement data attributes with corresponding disk region attributes. For example, performance-critical data having a hot disk region placement attribute may be associated with a hot disk region that is located near the outer edge of a disk.

In embodiments, rebalancing of stored data may be executed immediately following data partition boundary adjustment. In various embodiments, boundary adjustment and data re-balancing may be scheduled and performed as separate events to reduce the system performance cost of executing dynamic disk repartitioning.

C. Method for Dynamic Storage Repartitioning

FIG. 6 depicts a method 600 for dynamic storage repartitioning according to various embodiments of the invention. Method 600 may be implemented in embodiments of dynamic repartitioning system 500.

In embodiments, dynamic repartitioning of a disk comprising a plurality of partitions sharing adjustable partition boundaries is in response to receiving 605 a repartitioning task request 505 from an embodiment of a storage management system. As previously described, a repartitioning task request 505 may be generated in response to an update to one or more triggers. As previously described, a repartitioning task request 505 may comprise at least one boundary adjustment parameter that identifies the adjusted location of a partition boundary 235 and/or enables computation of the adjusted boundary location. In various embodiments, the location of the partition boundary is adjusted 610 in response to receiving a repartitioning task request 505.

In embodiments, stored data is allocated to a partition based on identifying an association between at least one attribute of the data and at least one attribute of the partition. In various embodiments, a disk may be partitioned into regions based on data access performance, with higher performance (hot) regions being located nearer to the disk outer edge and lower performance (cold) regions being located nearer to the disk spindle. In embodiments, performance-critical data assigned a hot disk region placement attribute are allocated to a hot disk region, while data assigned a cold disk region placement attribute are allocated to a cold disk region.

In various embodiments, a boundary adjustment is made to optimize storage usage and/or data access performance, as previously discussed.

After the adjustment of the boundary between two partitions, the data stored within the partitions may need to be rebalanced 615 to insure that misplaced data (i.e., data associated with one partition that now are located within the other partition) are reallocated to the partition with which they are associated. In various embodiments, data rebalancing may be executed in response to completion of a partition boundary adjustment, or rebalancing may be scheduled for execution as a separate event. Methods for data rebalancing will be discussed in detail in the following section.

1. Methods for Rebalancing Stored Data

Figure 7:
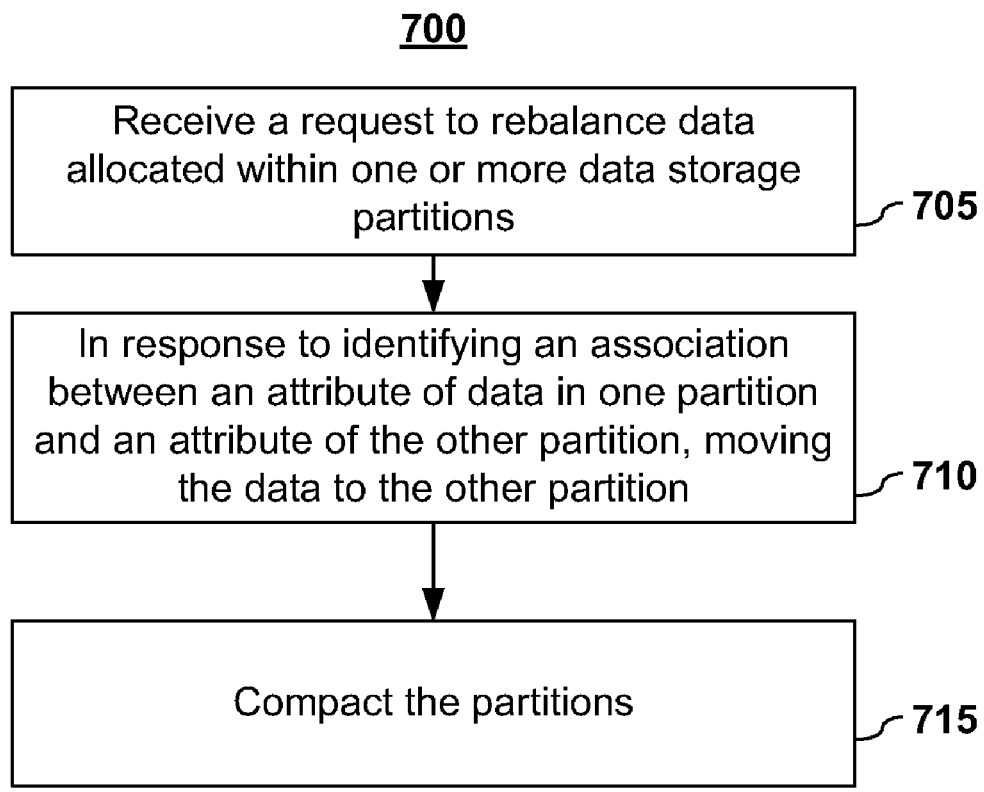
FIG. 7 depicts a method for rebalancing stored data according to various embodiments of the invention.

FIG. 7 depicts a method 700 for rebalancing stored data according to various embodiments of the invention. Method 700 may be implemented as step 615 in embodiments of method 600, and may be implemented in embodiments of data reallocator 520 in dynamic repartitioning system 500.

After receiving 705 a request to rebalance data allocated within data storage partitions, misplaced data (i.e., data associated with one partition that now are located within another partition) are relocated 710 to available storage space within the partition with which they are associated. In embodiments, stored data are allocated to a partition based on identifying an association between at least one attribute of the data and at least one attribute of the partition, as previously discussed.

In various embodiments, the rebalanced data within the partitions may be compacted 715 to improve performance. In embodiments, compaction may be performed once for all data, while, in alternate embodiments, the data within each partition may be compacted separately.

Figure 8:
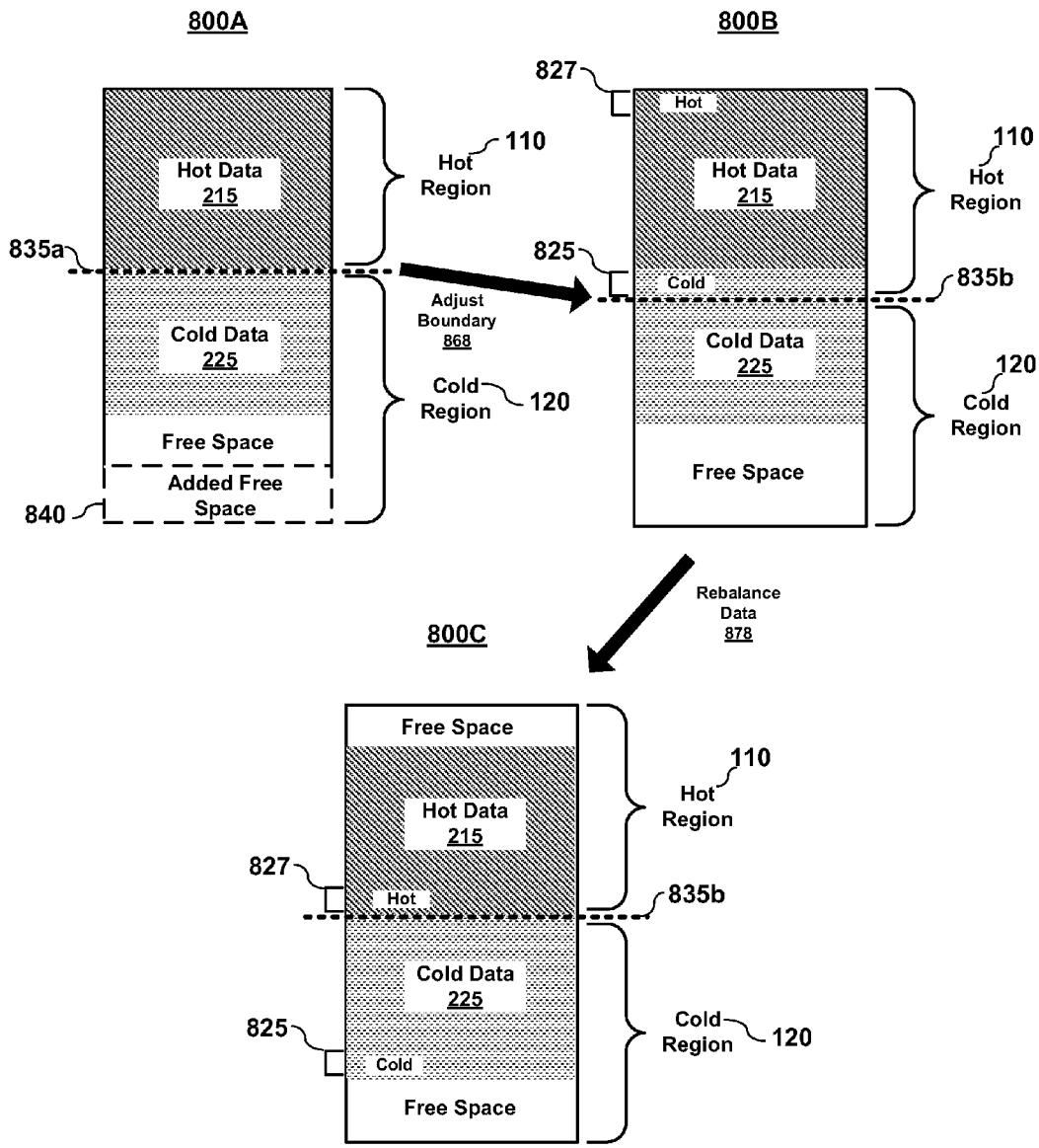
FIG. 8 illustrates an exemplary scenario for rebalancing data stored on an exemplary disk according to various embodiments of the invention.

FIG. 8 depicts, for illustration and not for limitation, an exemplary scenario for rebalancing data stored on an exemplary disk after a partition boundary adjustment according to various embodiments of the invention. The exemplary disk initially was partitioned into two partitions (a hot partition 110 and a cold partition 120). Data are placed into a partition according to a disk placement attribute; hot data 215 are allocated to the hot partition 110 and cold data 225 are allocated to the cold partition. The disk has a data layout in which the allocated data are compacted and there is no free space in the hot partition 110.

In 800A, storage reallocation has occurred and the disk storage space has been increased 840. In 800B, the location of the partition boundary 835*a* has been adjusted 868 in response to the addition of the additional storage space, in order to add free space to the hot region. After adjustment of the location of the partition boundary 835*b*, the hot partition 110 has increased its size relative to the cold partition 120. Since the compacted data in both partitions is placed adjacent to the partition boundary 835 and the boundary 835*b* has been moved to a former cold region 120 location, there now is cold data 825 misplaced in the hot region 110 and hot data 827 located in the region of the hot partition where free space will be added. 800C illustrates the disk layout after data rebalancing 878 has been executed. Free space has been distributed to the hot region 110, the misplaced cold data 825 has been moved to available space within the cold partition 120, and the hot data 827 has been moved to a location within the hot partition 110 closest to the adjusted boundary 835*b*. In embodiments, data files within a region may be assigned higher performance characteristics than other files, in which these files may be placed in the higher performance areas of a partition.

a) Rebalancing Stored Data by Alternately Processing Partitions

Figure 9:
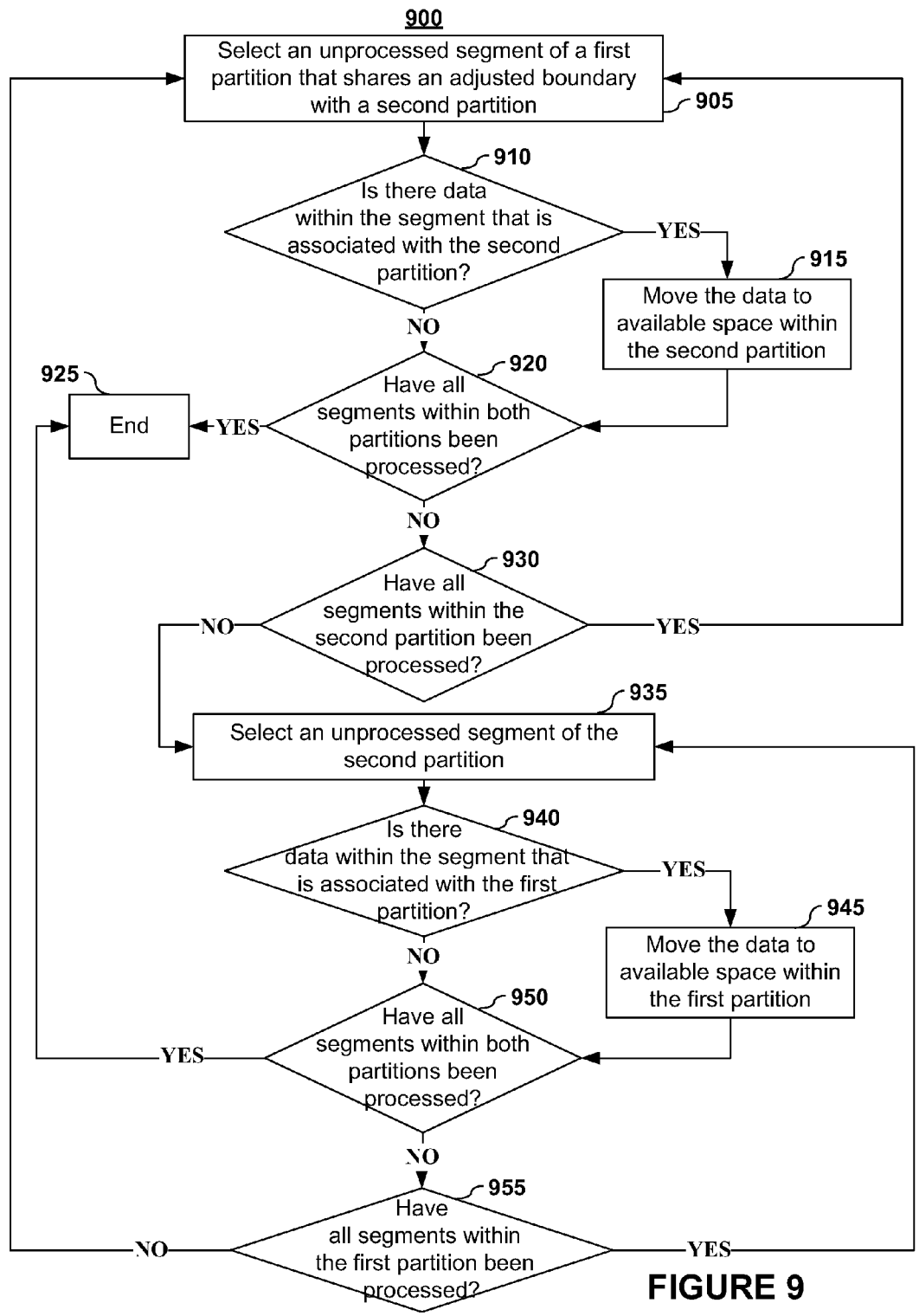
FIG. 9 depicts a method for rebalancing stored data by alternately processing partitions according to various embodiments of the invention.

FIG. 9 depicts a method 900 for rebalancing stored data by alternately processing partitions according to various embodiments of the invention. Method 900 may be implemented as step 710 in embodiments of method 700. A benefit of method 900 is that it can be applied when there is little free space in one or more of the partitions.

In embodiments, adjacent partitions (a first partition and a second partition) are examined alternately in order to identify and relocate misplaced data. In various embodiments, successive segments of each partition are examined. Those skilled in the art will recognize that the choice of segmentation scheme being applied to the partitions is not critical to the invention.

In embodiments, an unprocessed segment of the first partition is selected 905 for examination. In embodiments, a segment may be a data file. In various embodiments, examination begins by selecting the partition segments closest to the partition boundary and then successively selecting partition segments further from the boundary, but those skilled in the art will recognize that the choice of segment selection criteria is not critical to the invention.

If misplaced data (i.e., data associated with the second partition) is identified 910 within the selected segment, the misplaced data are moved 915 to available space within the second partition. If more processed segments remain in the first segment 920 and no further unprocessed segments are in the second partition (the alternate partition) 930, then steps 905, 910, 915, and 920 are repeated.

If unprocessed segments remain in the second partition, an unprocessed segment of the second partition is selected 935 for examination. If misplaced data (i.e., data associated with the first partition) is identified 940 within the selected segment, the misplaced data are moved 945 to available space within the second partition. If more processed segments remain in the second segment 950 and no further unprocessed segments are in the first partition (the alternate partition) 955, then steps 935, 940, 945, and 955 are repeated. If unprocessed segments remain in the second partition, an unprocessed segment of the first partition is selected 905 for examination and steps 905, 910, 915, and 920 are repeated. All data have been rebalanced 925 when all segments within both partitions have been processed 920, 955.

In alternative embodiments, segments within a partition are examined until either misplaced data is identified or no unexamined segments remain. In yet other alternative embodiments, the locations of misplaced data within both partitions are identified, and the mismatched data are relocated alternatively or all at once.

D. Computing System Implementations

It shall be noted that the present invention may be implemented in any instruction-execution/computing device or system capable of processing data. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
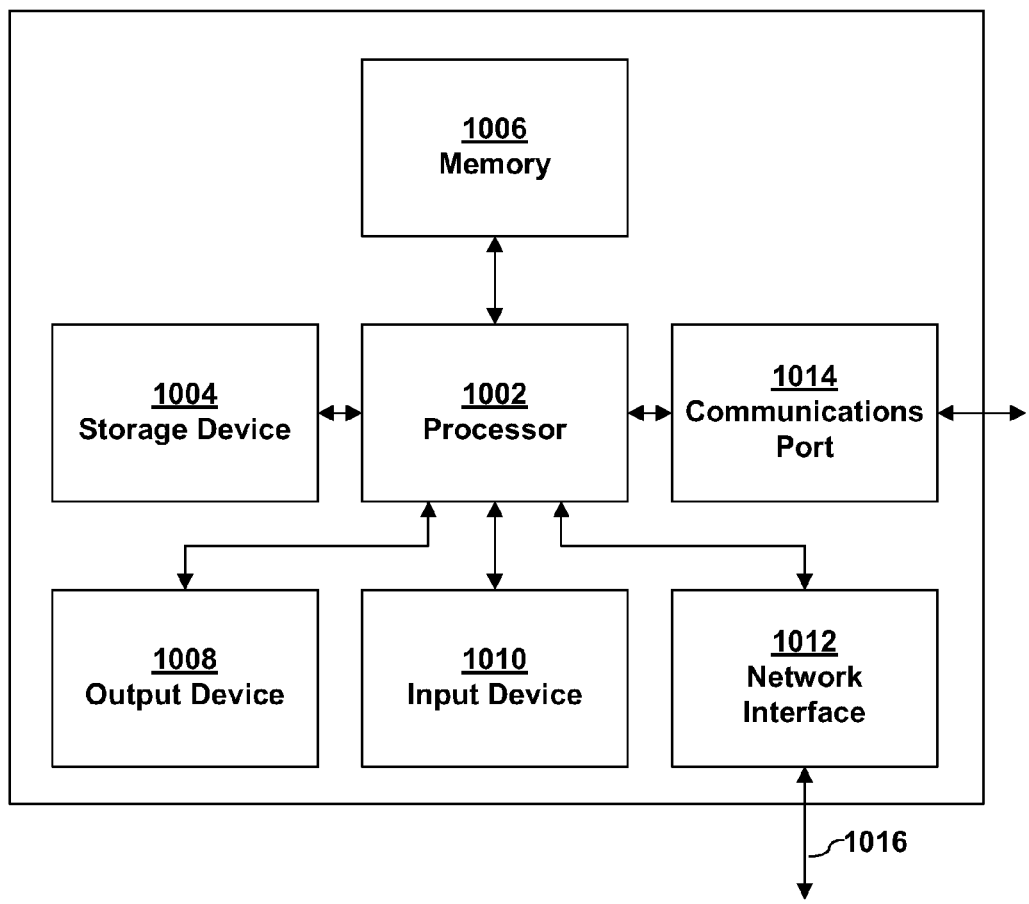
FIG. 10 depicts a block diagram of a computing system according to various embodiments of the invention.

FIG. 10 depicts a functional block diagram of an embodiment of an instruction-execution/computing device 1000 that may implement or embody embodiments of the present invention. As illustrated in FIG. 10, a processor 1002 executes software instructions and interacts with other system components. In an embodiment, processor 1002 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a magnetic or optical media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In one embodiment, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the components of FIGS. 2-5, and 8 may be modules stored in memory 1006 and/or storage 1004, and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

In embodiments, computing system 1000 may include one or more databases, some of which may store data used and/or generated by programs or applications. In embodiments, one or more databases may be located on one or more storage devices 1004 resident within a computing system 1000. In alternate embodiments, one or more databases may be remote (i.e. not local to the computing system 1000) and share a network 1016 connection with the computing system 1000 via its network interface 1014. In various embodiments, a database may be a relational database, such as an Oracle database, that is adapted to store, update, and retrieve data in response to SQL-formatted commands.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the spirit and scope of the present invention. It is therefore intended that the following claims include such modifications, permutation, and equivalents as fall within the spirit and scope of the present invention.

What is claimed is:

1. A computer program product comprising at least one computer-readable medium storing one or more sequences of instructions, wherein execution of the one or more sequences of instructions by one or more processors causes the one or more processors to execute a computer-implemented method for dynamically repartitioning data storage comprising partitions by performing the steps comprising:

responsive to a request to repartition the data storage, wherein the request is in response to at least one trigger in a set of triggers being satisfied, and wherein data is allocated to a data storage partition based on identifying an association between at least one attribute of the data and at least one attribute of the partition, adjusting the location of at least one adjustable boundary between the partitions; and rebalancing the data allocated to the data storage in response to identifying mismatched data having an attribute associated with a second data storage partition and being located in a first data storage partition, by relocating the mismatched data to the second partition.

2. The computer program product of claim 1 wherein the data storage is virtual storage.

3. The computer program product of claim 1 wherein the set of triggers comprises at least one of:
a change in the ratio of the first partition size to the second partition size; a change in data storage;
a data rebalancing request received from a user;
a partition having reached a threshold limit of available storage space; and a set of storage usage parameters.

4. The computer program product of claim 1 wherein a value of a data attribute is assigned by at least one of:
assigning the value to an attribute of a data file;
assigning the value to an attribute of a class or type, and assigning the data file to the class or the type;
assigning the value to an attribute of a customizable template, and associating the data file with the template; and
determining the value by inference based on data file usage parameters, and assigning the value to an attribute of the data file.

5. The computer program product of claim 4 wherein the data attribute value is configurable.

6. The computer program product of claim 5 wherein the data attribute is a performance attribute that is assigned a higher performance value or a lower performance value.

7. The computer program product of claim 6 wherein performance critical data that is assigned the higher performance value is associated with a higher performance partition.

8. The computer program product of claim 1 wherein data allocated to the first partition and data allocated to the second partition are compacted by being placed adjacent to the adjustable boundary between the first partition and the second partition.

9. The computer program product of claim 1 wherein rebalancing data allocated to the data storage comprises alternately examining the first partition and the second partition to identify the mismatched data.

10. The computer program product of claim 1 wherein rebalancing data allocated to the data storage further comprises compacting the data in at least one partition.

11. A computer processing system for dynamically repartitioning data storage within a mass storage device, the system comprising:

a computer, including a computer readable storage medium and processor;

a mass storage device comprising a plurality of partitions;

a boundary configurator, executing on the computer, that in response to a request to repartition the data storage, adjusts the location of at least one adjustable boundary between a first partition and a second partition within the plurality of partitions on the mass storage device, wherein the request is in response to at least one trigger in a set of triggers being satisfied, and wherein data is allocated to a particular partition based on identifying an association between at least one attribute of the data and at least one attribute of the particular partition; and a data reallocator, executing on the computer, that rebalances the data allocated to the data storage in response to identifying mismatched data having an attribute associated with the second partition and being located in the first partition, by relocating the mismatched data to the second partition.

12. The computer processing system of claim 11 wherein a performance data attribute is a high performance attribute or a low performance attribute, and data that is assigned the performance attribute is associated with a higher performance partition.

13. The computer processing system of claim 12 wherein the set of triggers comprises at least one of:
assigning the value to an attribute of a data file;
assigning the value to an attribute of a class or type, and assigning the data file to the class or the type;
assigning the value to an attribute of a customizable template, and associating the data file with the template; and
determining the value by inference based on data file usage parameters, and assigning the value to an attribute of the data file.

14. The computer processing system of claim 12 wherein a value of a data attribute is user-defined or usage-defined.

15. The computer processing system of claim 14 wherein the data attribute value is configurable.

16. A method for reallocating data comprising:
providing a computer, including a computer readable storage medium and processor;
providing a mass storage device comprising a plurality of partitions;
responsive to a request to repartition data storage within the mass storage device, wherein the request is in response to at least one trigger in a set of triggers being satisfied, and wherein data is allocated to a partition based on identifying an association between at least one attribute of the data and at least one attribute of the partition, adjusting the location of at least one adjustable boundary between the partitions by a boundary configurator executing on the computer;
rebalancing the data allocated to the data storage, by a data reallocator executing on the computer, in response to identifying mismatched data having an attribute associated with a second partition and being stored in a first partition in the data storage, the first partition and the second partition being partitions from the plurality of partitions; and
relocating the mismatched data to the second partition.

17. The method of claim 16 wherein the at least one adjustable boundary is between the first partition and the second partition, and the first partition and the second partition are processed alternately by performing steps comprising:
relocating mismatched data within a segment of the first partition to the second partition in response to identifying an association between an attribute of the mismatched data an attribute of the second partition; and
relocating mismatched data within a segment of the second partition to the first partition in response to identifying an association between an attribute of the mismatched data and an attribute of the first partition.

18. The method of claim 17 wherein a segment is a data file.

19. The method of claim 17 wherein selecting a segment to examine is based on proximity of the segment location to the location of the at least one adjustable boundary.

20. The method of claim 16 further comprising compacting data within at least one partition of the data storage.

* * * * *